United States Patent
De Bie et al.

(10) Patent No.: US 7,589,851 B2
(45) Date of Patent: Sep. 15, 2009

(54) SYSTEM FOR JOB CONTROL OF A DOCUMENT PROCESSING SYSTEM AND METHOD FOR JOB CONTROL OF DOCUMENT PROCESSING PROCESS

(75) Inventors: Carolus De Bie, Turnhout (BE); Peter Frings, Wilrijk (BE); Bert Wynants, Westerlo (BE)

(73) Assignee: Agfa Graphics NV, Mortsel (BE)

( * ) Notice: Subject to any disclaimer, the term of this patent is extended or adjusted under 35 U.S.C. 154(b) by 887 days.

(21) Appl. No.: 10/817,226

(22) Filed: Apr. 2, 2004

(65) Prior Publication Data

US 2004/0199865 A1 Oct. 7, 2004

Related U.S. Application Data

(60) Provisional application No. 60/485,937, filed on Jul. 9, 2003.

(30) Foreign Application Priority Data

Apr. 2, 2003 (EP) .................................. 03100871

(51) Int. Cl.
*G06F 3/12* (2006.01)
(52) U.S. Cl. ...................... 358/1.15; 358/1.9
(58) Field of Classification Search ................ 358/1.15, 358/1.9; 700/52, 127; 382/167
See application file for complete search history.

(56) References Cited

U.S. PATENT DOCUMENTS 5,835,627 A * 11/1998 Higgins et al. .............. 382/167
5,850,339 A * 12/1998 Giles .......................... 700/52
6,046,818 A *  4/2000 Benson ..................... 358/1.15
6,411,314 B1 * 6/2002 Hansen et al. ............. 358/1.15
6,421,575 B1 * 7/2002 Shakespeare ............... 700/127
6,542,173 B1 * 4/2003 Buckley ..................... 358/1.9
7,027,187 B1 * 4/2006 Zuber ......................... 358/1.9

FOREIGN PATENT DOCUMENTS

EP       0887746 A2   12/1998
EP       1220085 A2    7/2002

* cited by examiner

*Primary Examiner*—Twyler L Haskins
*Assistant Examiner*—Nicholas C Pachol
(74) *Attorney, Agent, or Firm*—Keating & Bennett, LLP

(57) ABSTRACT

A job control system for a document processing system wherein a number of tasks is performed in a workflow includes a user interface to define or change parameters. The job control system includes an identifier to identify and mark dependencies of one or more intermediate and/or final results to parameters. This enables a verifier, also part of the job control system, to verify, during execution of the job, a change in parameter and to determine whether or not an intermediate and/or final result obtained before the change in parameter is still useable despite the occurred change in parameter. The job control system furthermore includes a memory for storing the usable intermediate and/or final results. This enables, in case a parameter is changed, to use those results that are still useable, thus saving time.

13 Claims, 14 Drawing Sheets

△ Separation Output and Order

▽ Image

Border: [ System Imposition Proof  ▸ ]

Orientation: [ 0  ▸ ]

☐ Apply Ganging    ▨ Across Jobs

Media Margins:  Extra feed before job: [ 0 mm ]   Left: [ 0 mm ]
                After job: [ 0 mm ]   Right: [ 0 mm ]

☐ Print RuleUp       Color: [ Blue ▸ ]   [ ▸ ] Dashed
☐ Print Crop Marks   Color: [ Red ▸ ]    [ ▸ ] Dashed △ Scaling
△ Slug Lines

FIG. 13

Image Handling

| | Downsample | | To | | Above | | Compress | |
|---|---|---|---|---|---|---|---|---|
| Monochrome ☐ | Average downsampling ▼ | | 1200 | dpi | 1800 | dpi ☐ | CCITT Group 4 | ▼ |
| Grayscale ☐ | Average downsampling ▼ | | 300 | dpi | 450 | dpi ☐ | JPEG Maximum Quality | ▼ |
| Color ☐ | Average downsampling ▼ | | 300 | dpi | 450 | dpi ☐ | JPEG Maximum Quality | ▼ |

☐ Compress text and line art
Note: the 'Above' field must be greater than or equal to the 'To' field.

General

Compatibility: Acrobat 4.0 (PDF 1.3) ▼     ☐ ASCII format
Binding Style: Left ▼                      ☐ Convert separations into composite
Resolution: 1200 dpi     ☐ Use output resolution

Application Settings

☑ Preserve UCR and Black generation
Remove ▼ transfer functions
☑ Preserve Halftone information
Note: select 'Preserve Transfer functions' when the PostScript is pre-separated.

Pages

Default page size:   Width: 210 mm        Bleed amount: 12.7 mm
                     Height: 297 mm

Pantone Colors

☑ Convert all Pantone color names to: Follow paper type ▼
☑ Use Pantone 2000 color names
Note: select "Follow paper type" and use Pantone 2000 names to guarantee matching book colors.

Missing Fonts

☐ Accept and make a PDF anyway     Substitute missing fonts with: Courier ▼

Subset Fonts

☐ Subset all embedded fonts below: 20 %

Overprint Settings

☑ Honor application settings

PostScript Color Management

☑ Honor application settings

FIG. 14

SYSTEM FOR JOB CONTROL OF A DOCUMENT PROCESSING SYSTEM AND METHOD FOR JOB CONTROL OF DOCUMENT PROCESSING PROCESS

This application claims the benefit of U.S. Provisional Application No. 60/485,937 filed Jul. 9, 2003.

FIELD OF THE INVENTION

The present invention relates to a job control system for job control of a document processing system in which processing system a number of tasks is performed in a workflow, the job control system comprising an input source with a user interface for enabling a user to define or change parameters for or within the workflow. Such job control systems are known for instance from European Patent Application no. EP 1 220 085 and U.S. Pat. No. 6,046,818 both herein incorporated by reference in their entirety for background information.

The present invention also relates to a method for controlling a document processing system in dependence on processing parameters.

BACKGROUND OF THE INVENTION

Printing engines such as laser printers, plotters, and other printing devices produce an image or "visual representation" on a sheet of paper or the like. A printing engine can print dots on a piece of paper corresponding to the information of a bitmap (or pixelmap where a pixelmap is characterized as having a depth of one, two or more bits) which forms an input for the printing engine. A bitmap (or bitmap file) forms a digital representation of the visual representation of the page to be printed. A printing device creates a visual representation by printing an array of pixels arranged in rows and columns from the bitmap.

Such a printing engine may be used to produce books, newspapers, pamphlets, posters and other single and multi-page printed matter. The printing press may advantageously print multiple pages of printed matter at the same time onto a single sheet. Besides printing presses other devices used for printing multiple pages at the same time include e.g. image setters and plate setters.

The data for each single page are conventionally in a page description language file (PDL). For that purpose each page may have been e.g. produced by a Page Layout applications such as e.g. Quark Express, PageMaker etc., the data having been put in a page description language file (PDL). A page description language (PDL) is a high level language for describing objects to be displayed by an output device. Examples of PDL are PDF and Postscript. These PDL files conventionally form the input for the system in accordance with the invention.

Conversion means that produce a bitmap output file in response to a number of page description language input files are widely used. Such a conversion means has a means (e.g. an interface) for receiving page description data in the form of a number of PDL files. In order to produce a finished sheet, the conversion means interprets the data contained in the PDL files, renders objects within the data into bitmap(s), and after all objects for the sheet are rendered, sends the bitmap file to a printing engine which prints the sheet.

Layout information describes how the pages are to be arranged to achieve the desired output result.

Rendering, i.e. PDL-to-bitmap transformation is another key processing-component of a printing process workflow system. The document processing system comprises a rendered to perform this task.

In a Job Ticket driven system a Job Ticket defines how a Job is to be assembled and processed. It defines the pages that are to be assembled and the processing settings for the pages and the flats, e.g. imposition, separation, trapping, rendering, etc. The job ticket is a detailed description on how a job is processed in the system. Job tickets are made via a Job Ticket editor and submitted to a server or are imported from another system e.g. print management system like an MIS or a Delano system. A number of specifications are used within the graphic arts industry such as e.g. the JDF specification and the PJTF specification for the job ticket for use as an interchange mechanism-between MIS systems and server.

To the different steps of the printing process parameters are associated, such as for instance parameters relating to resolution, color management, imposition schedule, trapping, rendering etc. The JDF specification and the PJTF specification enumerate many of the known processes and their associated parameters. The control system comprises an input source with a user interface for enabling a user to define or change processing parameters, often a graphical user input (GUI).

The user may define or change parameters explicitly and knowingly, for instance when resolution or is increased or color settings are changed, in which case it may be clear to the user which parameters he is changing, or implicitly for instance when the press is changed, which may effect several printing process parameters such as e.g. those associated with color management and trapping.

Also the user may change parameters relating not to a task or action within the workflow (resolution, imposition, color setting parameters etc.), but to the workflow itself e.g. by changing the sequential order of tasks to be performed in the workflow scheme (e.g. changing from a workflow scheme in which rendering is done prior to imposition to a workflow scheme in which imposition is done prior to rendering), i.e. change parameters for the workflow.

Under normal conditions one can assume that job tickets or jobs are submitted and run to completion with the preset values. This assumes that during the course of execution of the job nothing changes in the specification of the job or by implication nothing changes in the job ticket.

However sometimes mistakes are made or choices made by the client or operator are less then perfect or very simply a change of mind occurs. Such mistakes or less than perfect choices or changes of mind can be for instance:

the wrong interpretation of the customer specification of the job into job specific settings in the job ticket content errors or modifications like typo's, price changes, late updates, breaking news, etc.

Changing customer requirements: other screen, other resolution, other color settings Changing printing requirements; modified trapping, other web compensations . . .

Changing planning, e.g. intended equipment to produce the job is not available and a different equipment have different parameters must be used . . .

etc.

Mistakes or changing requirements require known job control systems to abort the job in process. At that moment in time the operator has a few choices.

For simplicity reasons the operator might decide that the job parameters are changed in the job ticket and a completely new job is submitted, yielding the new output requirements. This puts a high burden on the prepress processing system. All intermediate results need to be regenerated. The consistency of the output is guaranteed. As mistakes are often detected in the proofing cycle late in the production, the response time to changes is vital to maintain press-up times (cost, customer satisfaction), The operator might also, at least theoretically, decide to intervene into the prepress system and try to split up the job in a part that can be re-used for further processing and another part that needs to be resubmitted from scratch with the new settings in the job ticket. This is a time consuming and difficult process and prone to errors, especially given the fact that there is usually little response time available and the choices have to be made under great time pressure.

Neither of the choices is, especially late in proofing cycle late in production, an attractive choice. However, present job control systems do not provide any other solution.

SUMMARY OF THE INVENTION

It is an object of the invention to provide a method, system and apparatus to reduce one or more of the above cited problems.

To this end the job control system is characterized in that it comprises:

an identifier to identify and mark dependencies of one or more intermediate and/or final results to parameters in or for the workflow and/or to individual task processors in the production plan a verifier to verify, during job execution, a change in parameter, and establish whether or not an intermediate and/or final result obtained before the change in parameter is still useable despite the occurred change in parameter and a means for storing usable intermediate and/or final results.

The invention is based on the recognition that when a change of parameter in or for the workflow is effected, during execution of a job, a lot of intermediate and final results may still be reusable. Verifying, in case a parameter is changed during execution of a job, whether or not an intermediate result is affected and storing useable intermediate results, enables reusing of intermediate results. By identifying and marking dependencies of intermediate results and verifying and storing reusable intermediate results, restart of the process can be more effectively executed.

Storing within the framework of the present invention means any action by which the intermediate results are retrievable. The storage means themselves (i.e. where the data are stored) may form a part of the system itself (and in preferred embodiments forms a part of the system itself). "Storing means" thus should be interpreted broadly, e.g. the intermediate results can be transmitted to some remote storage device for later retrieval. The data of the intermediate result(s) itself , need not be stored in the system itself (although in preferred embodiments they are), but on some data carrier or other storage device which is separate from the system itself. So a storing means is a means for storing the data whether it is stored inside the system itself (on a hard disk for instance) or on a removable carrier (a remote device for instance) or broadcasted or transmitted to some device outside the system itself for storage by such a remote device. The important aspect is that useable intermediate results are identified and retrievable. Within the framework of the invention the job control system preferably comprises an identifier and verifier for all dependencies.

A production plan (or job ticket definition) is composed of a number of Task Processors (TP) (aka Job Ticket processors (JTP)). Each TP or JTP has a set of parameters associated with it. To the different steps of the printing task processors (TP) and process steps parameters are associated, such as for instance parameters relating to resolution, color management, imposition schedule, trapping, rendering etc.

The control system comprises an input source with a user interface for enabling a user to define or change processing parameters, often a graphical user input (GUI). Each TP or at least a number of the most important TP's has an associated (G)UI (Graphical) User Input to set or change the individual parameters. The input source conventionally visualizes the parameters in a logical order and associates them with a certain TP in the production plan. Prima facie, this would seem to be a straight-forward situation: if a certain parameter is changed by a user for a JTP corresponding to a particular step in the workflow it would seem logical that every intermediate result prior to that step is still valid, whereas starting with that particular step all calculation redone. However, the parameter association between GUI, i.e. user input, and JTP, i.e. task processor does not always correspond to the JTP where the actual execution is. In other words, some parameters are defined in another TP than they are actually executed. The user is often unaware of these facts.

The complex parameter dependency is especially true for the renderer. A lot of parameters and resources are defined in other TP GUI's than the render TP GUI, e.g. the resolution is set at the level of the device (output) TP but the renderer is required to do the appropriate rendering at the requested resolution. The render TP looks e.g. ahead in the production plan and determines the requested resolution for the engine. At the time the renderer generates the output bitmap (intermediate result) for the device at the appropriate resolution the identifier (which in this case is or forms a part of or is coupled with the renderer) puts a dependency from the output result to the selected-resolution of the device, i.e. the output result is 'ear-marked'. This marking may be for instance a set of parameter data attached to the output bitmap file, or a link to a file comprising said set of parameter data.

When during job execution the resolution is changed, the verifier of the job control system of the invention compares the resolution parameters of the output bitmap with the effective (in this case changed) resolution parameters and comparing these parameter data and noticing the difference recognizes that the intermediate result (output bitmap) is invalid. However, as will be explained below other intermediate results, in this case those intermediate results are not dependent on the resolution parameter(s), may still be valid or useable. The verifier identifies such valid or still useable intermediate results and stores them.

The dependencies may themselves be dependent on the general workflow scheme, which workflow scheme may be user definable. By changing the workflow the user may, without realising that this happens, change the dependency and thereby make intermediate result invalid. E.g. if rendering is done prior to imposition, the rendition is not dependent on imposition parameters, in which case a change in imposition does not affect rendition. So in such circumstances, if during job execution the imposition scheme is changed, the verifier recognizes that the intermediate result of the rendered page bitmap is still valid, despite the change in imposition, and the intermediate valid result is stored.

If rendering is done after imposition any change in imposition may affect rendition, in which case the intermediate result may be invalid and recognized as such by the verifier. If the workflow is changed from a situation in which rendition precedes imposition to a workflow in which imposition precedes rendition, this change in the workflow scheme will effect the dependency mechanism. These sometimes complicated dependencies make it even for an experienced operator difficult to intervene manually in the process when a parameter has been changed and split up the job without running a substantial risk that errors are made, leaving little choice but resubmitting a new job ticket and redoing all the steps and calculations.

The system in accordance with the invention provides an identifier to identify and mark dependencies of intermediate and/or final results to parameters and a verifier to determine the validity of intermediate and/or results in the context of the changed processing parameters and storing still useable intermediate and/or final results enabling to use these valid results without the need for recalculation. The identifier preferably forms part of a Task Processor (TP) for providing the intermediate result. The identification and marking can be done afterwards or separately from the actual task processors. However identifier that form part of the task processor are preferred since the marking is than done immediately following or preceding the actual production of the intermediate result which reduces the change of errors being made and increases the speed of the process and reaction time to changes.

Within the context of the invention several embodiments are possible.

In an embodiment the system comprises a verifier to verify only whether or not intermediate results are affected by the occurred change in parameter and storing the unaffected intermediate results only.

In such simple systems intermediate results which are affected by the occurred change in parameter will always be recalculated. Although this is a relatively simple system it will still be advantageous. In such systems there is always a recalculation if the intermediate result is dependent on the changed parameter.

In preferred embodiments of the system the verifier comprises
    means for calculating or estimating for intermediate or final results affected by the occurred change in parameter the effect of the occurred change in parameter
    for comparing this to a limit value for determining whether or not the intermediate results are useable and
    for storing the useable intermediate results.

At least some intermediate results may be effected by the occurred change in parameter to an extent that the difference between the non-recalculated and the recalculated intermediate result remains below an acceptable limit. Recalculation of the intermediate result(s) leads in such circumstances to a situation in which time is lost without a perceivable effect.

In the preferred embodiment the verifier has means to calculate or estimate the effect of the occurred change on the intermediate result (for instance by means of some course formula, or a table) and compare the result of the effect calculation or estimation to a standard and decide on the basis of this comparison whether or not originally established intermediate results (i.e. before the occurred parameter change) are useable and then store the useable intermediate or final results.

In further embodiments the system has means for setting at least one limit value. The operator can thereby instruct the system below which limit value the intermediate result is still useable and above which the intermediate result is to recalculated.

The setting of the at least one limit value can be direct, i.e. the operator sets a specific standard. "Settting" within this concept means also to ignore certain parameter changes (which is equivalent to setting the limit value such that the estimated or calculated difference is always smaller than the standard). The setting of the limit value or values may also be in the form of an overall setting (coarse, fine, medium quality, high quality).

Furthermore one or more standards may be dependent on parameters which are themselves settable. For instance, when the printing is done on a coarse mode, the standards will be relatively low, i.e. a lot of intermediate results may be useable, whereas where a high quality print is required the standards will be relatively severe.

In preferred embodiments of the invention the system comprises means for notification to a user of a change in parameter, for indicating the effect of the change of parameter and for giving the choice of recalculation or not.

In an embodiment, the job control system has a controller for, after change of a parameter during execution of a job, and identification and storing of the reusable intermediate results, automatically re-submitting the job, while changing the job ticket such that the stored reusable intermediate results are reused.

This allows an automatic resubmission of the job. If during execution it is found that a parameter has been changed, the job ticket is changed in such manner that the still usable intermediate results are used, bypassing the process steps in the original job ticket which have lead to the reusable intermediate results. Instead of having to resubmit the job ticket in toto and redoing all steps of the prepress processing only those steps effected by the change in parameter(s) are redone.

In this embodiment the strength and advantage of the invention is most clearly perceivable since in a safe yet swift and efficient manner last minute changes are possible. As mistakes are often detected in the proofing cycle late in the production, the possible to achieve a short response time to changes in a safe manner is of high importance to maintain press-up times and thereby reduce cost and increaser customer satisfaction.

In a second embodiment the job control system has a display device to display to the user which intermediate results are still valid and/or which intermediate results are no longer valid. This will allow the user a choice to resubmit the job ticket in toto (e.g. if little or no intermediate results are usable), to continue the original job ticket (e.g. if only a limited number of intermediate results have become invalid and the operator knows from experience that the errors due to the invalidity of the intermediate result are very limited) or to resubmit the job ticket in accordance with the hereabove given embodiment, i.e. using the valid intermediate results. In particular it will also give the user insight in the dependencies in a effective and useful manner, without requiring detailed knowledge.

In a preferred embodiment the displayer is for displaying the dependencies of the valid and/or invalid results on parameters and display which parameter has been changed and how.

In such embodiments the user is informed on the occurred change in parameters and which intermediate results are still valid and what changes has occurred. This embodiment is in particular advantageous in circumstances where a user is in the process of trying to define settings.

BRIEF DESCRIPTION OF THE DRAWINGS

In the drawings:

FIG. 13 illustrates an input screen for setting the border parameters.

Figure 1:
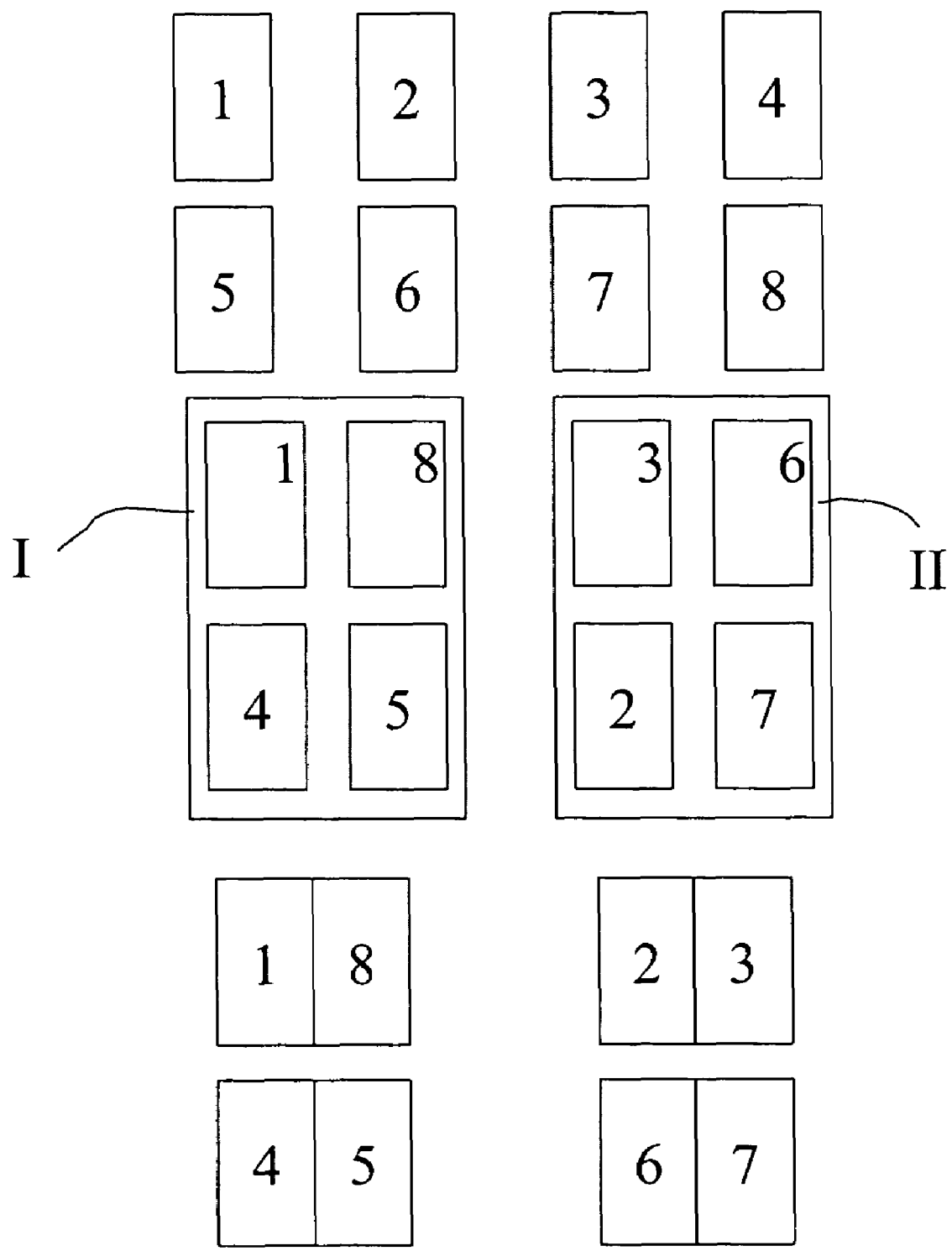
FIG. 1 illustrates schematically how multiple pages are combined into a multiple-page single sheet.

An example of color management is illustrated in FIG. 14, where an input screen is shown for input in the normalize task processor.

The figures are not drawn to scale. Generally, identical components are denoted by the same reference numerals in the figures.

DETAILED DESCRIPTION OF THE PREFERRED EMBODIMENTS

FIG. 1 illustrates schematically that a number of pages (1 to 8) are assembled on sheets I and II. From said sheets combinations (in this example pairs) of pages are cut (lowest part of the drawings), which may then be bound into a part of a book for instance. In this schematic figure all pages are shown in upright (or for some in upside down) position.

Figure 2:
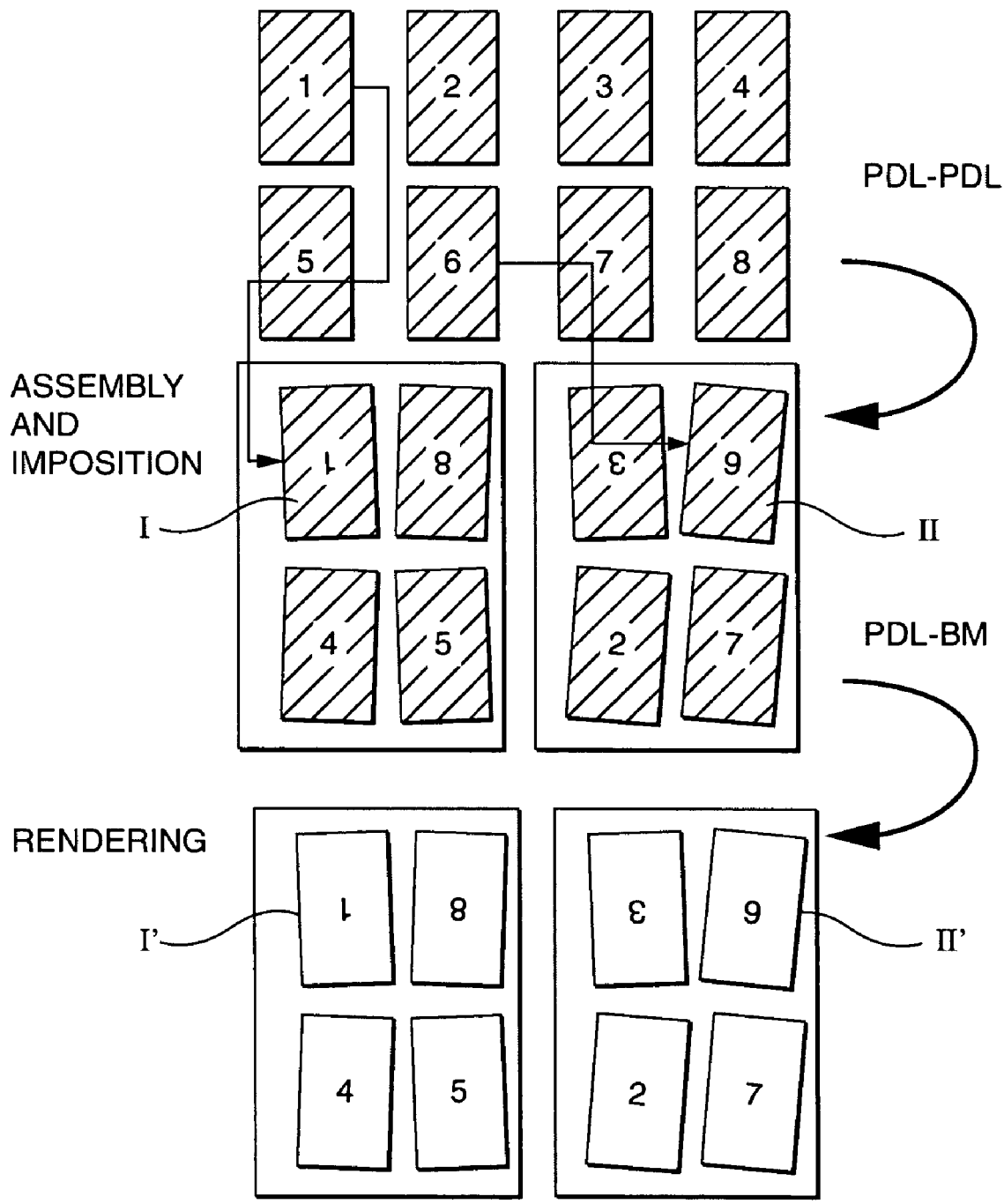
FIG. 2 illustrates schematically the preparation, including imposition, method known from U.S. Pat. No. 6,046,818.

FIG. 2 illustrates schematically the preparation, including imposition, method known from U.S. Pat. No. 6,046,818. In this and following figures gray pages or parts of pages stand for data in PDL format, whereas dotted paged stand for pages or part of pages in bitmap format. The pages in PDL format are assembled and impositioned into a PDL format file for each of the sheets I and II. This is schematically indicated by the arrow above which is indicated PDL-PDL, to indicate the input and output format of the process. Imposition is the pre-printing process of arranging the pages for a sheet to achieve a proper sequence or position of each page relative to other pages on the sheet. Imposition is performed to facilitate post-printing processes.

These processes may include fold and cut operations possibly followed by some form of binding. Imposition does not just entails flipping certain pages, but also more complex operations such as rotation, scaling, pixel alignment etc. In FIG. 2 this is schematically shown by the fact that some of the pages are slightly rotated. Thereafter the sheet-PDL files are rendered i.e. the PDL file for the sheets are transformed into sheet bitmap files. The imposition parameters are usually set by a user via an imposition GUI. The imposition parameters themselves may be themselves dependent on the printing engine used.

Figure 3:
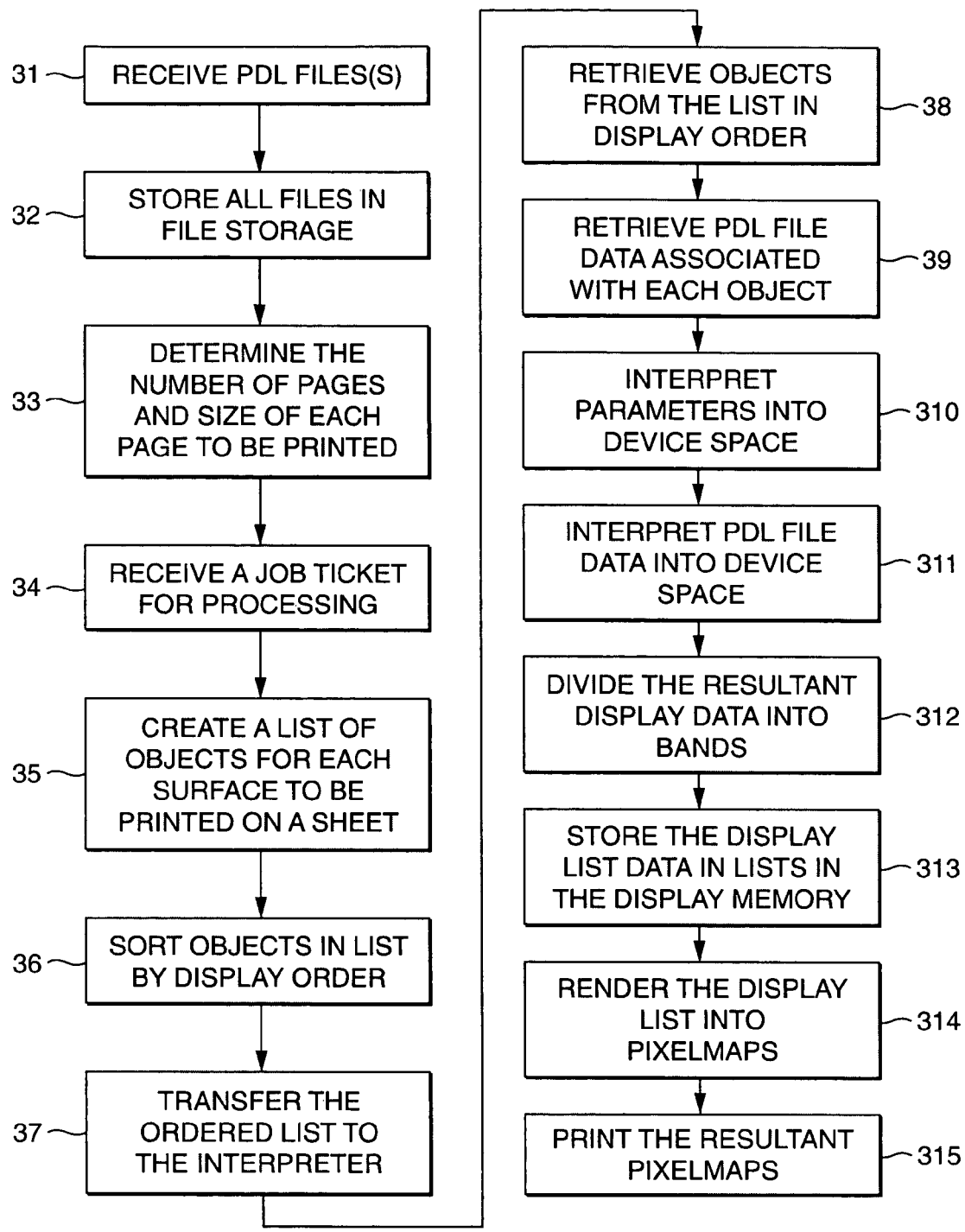
FIG. 3 illustrates in the form of a flow chart the process as known from U.S. Pat. No. 6,046,818.

FIG. 3 illustrates in the form of a flow-chart the method known from U.S. Pat. No. 6,046,818. The PDL files for the pages are received (31), they are stored (32), the number of pages and sizes of each page to be printed in determined (33), a job ticket is received (34), with which a list of object for each surface to be printed on a sheet is created (35), the objects are sorted (36), the ordered list is transferred to an interpreter (37), the objects are retrieved (38), as well as the PDL file data associated with each objects (39), interpreted parameters and data into device space (310, 311), division into bands (312), storage of the display list data into display memory, and finally before print, rendering of the display list data into pixel maps.

Figure 4:
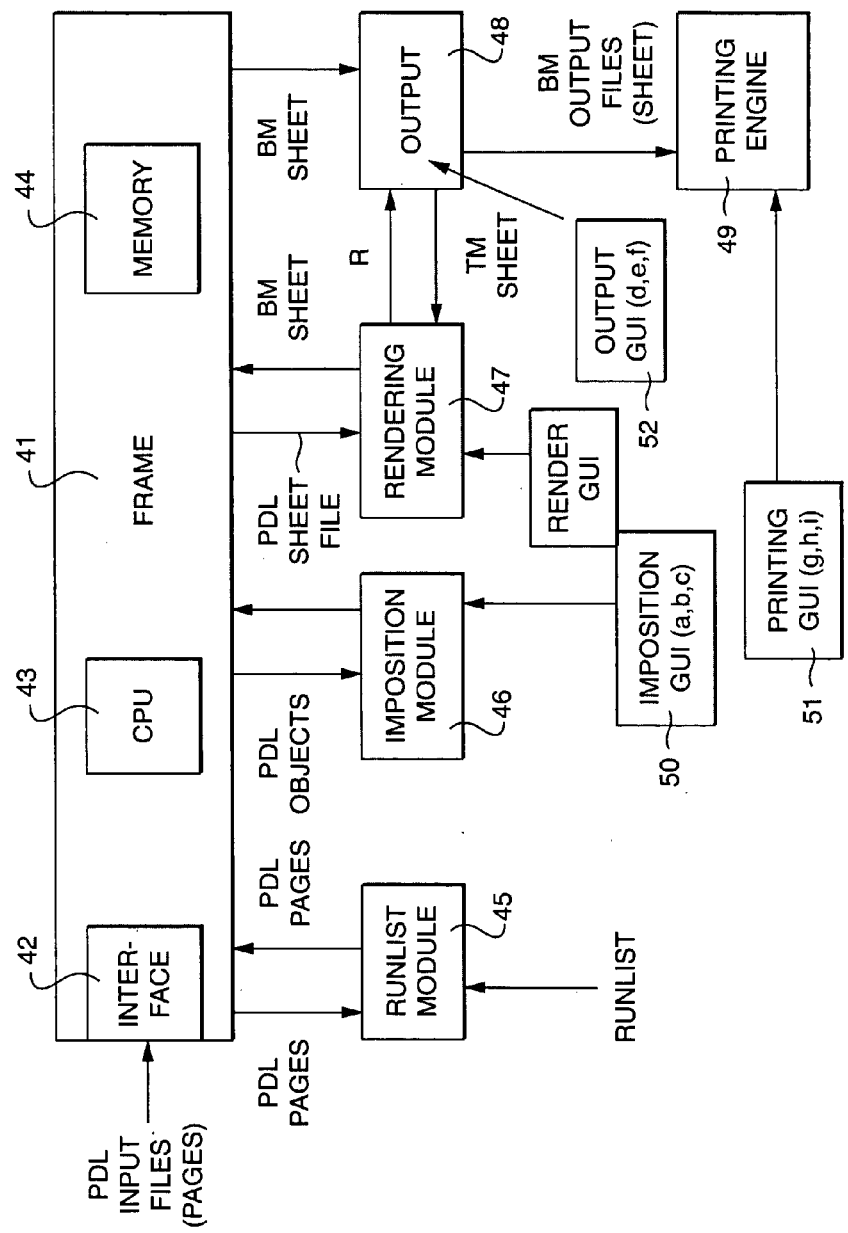
FIG. 4 illustrates schematically a system for a method of the type as known from U.S. Pat. No. 6,046,818.

FIG. 4 illustrates schematically a device for a method similar to the type as known from U.S. Pat. No. 6,046,818. The drawing is schematically indicating the flow of data, and several elements of the device. A means or module may be any piece of hardware or software or combination thereof to perform the indicated function, within the flow. Also, the different modules are indicated separate from each other for clarity sake, this is not to be restrictively interpreted as signifying that such modules are physically separate elements (although they might be). Often the modules will be in the form of a program codes operated within a computer workstation. Such a computer workstation itself may be a single apparatus, but also form part of a network, or even be distributed in separate locations, for instance when files are sent over an internal network or even over internet between devices.

An input of PDL files for a number of pages is via an interface 42 received by a central frame 41, which comprises a CPU (central processing unit) 43 and a memory 44. A runlist is made for the PDL pages in or by runlist module 45, this provides PDL objects in display order with layout, imposition module 46 assembles and impositions the PDL objects into a PDL sheet file and impositions the object on the sheet, creating a PDL sheet file.

The imposition module has associated with it an imposition GUI with which a user can set imposition parameters. Rendering module 47 transform using a transformation matrix TM sheet, the PDL sheet file into a bitmap (BM) sheet. The transformation matrix itself dependent on output parameters, which are set or changeable via the output GUI. The BM output file(s) are then sent to a printing engine 49 (via output 48) where the sheet or sheets are printed.

The whole of the printing process is governed by a job ticket. In a Job Ticket driven system a Job Ticket defines how a Job is to be assembled and processed. It defines the pages that are to be assembled and the processing settings for the pages and the flats, e.g. imposition, separation, trapping, rendering, etc. The Job ticket is a detailed description on how a job is processed in the system. Job tickets are made via a Job Ticket editor and submitted to a server or are imported from another system e.g. print management system like an MIS or a Delano system.

In the system as illustrated in FIG. 4 a number of user interfaces are present to set parameters, in this case, but this is not to considered as restrictive, there is a imposition GUI 50 (for setting imposition parameters), an output GUI 52 (for setting output parameters, such as resolution, color settings), a printing GUI 51 (for e.g. selecting the printing device) and a render GUI. Schematically these are indicated by parameters a, b and c for imposition, d, e and f for output, g, h and i for printing. We can see that the PDL sheet files (output of impositioner) are dependent on parameters a, b and c, the BM sheet files (output of renderer) are dependent on parameters a, b and c (since the input for the renderer is dependent on said parameters), but also on the parameters g, h and i since the renderer requests (R) the transformation matrix TM from the output module and in this transformation matrix TM the output parameters are inserted. In fact the situation may be more complicated since one or more of the imposition or output parameters may be dependent on the printing chosen printing engine and thus on the printing parameters.

For instance as an output parameter resolution may be chosen, if such chosen resolution is a well defined resolution (number of pixels per unit area), this may be defined independent of the chosen printing engine. However the output resolution parameter may also be "highest resolution". Just what "highest resolution" is may be dependent on the chosen printing engine, which makes the output parameter dependent on the printing engine parameters.

Likewise imposition parameters may be dependent or independent from printing parameters. In general the parameters set by a specific User interface module (GUI) for a task processor (TP) are of two different types, a first types of settings which only effect actions in the particular TP for instance a screen selection in a render TP, and a second type which are actually performed or effect a different TP.

Some examples of such second type of settings are given above, a further example is the following: if a different press is chosen this may require new rendering since a change in color management is required. Present job ticket control systems do not have means to keep track of such dependencies, thus a change in a setting requires a job ticket to be rerun in toto. It is in particular these second type of dependencies, often unknown to an operator, that makes it difficult, if not near impossible for operators to accurately predict the effect of a change of parameter, thus often requiring a rerun of the whole job when a parameter has changed.

In a job ticket control system in accordance with the invention an identifier to identify and mark dependencies of one or more intermediate and/or final results to parameters in or for the workflow and/or to individual task processors in the production plan and an verifier to identify, during execution, and in case a parameter is changed during job execution, whether or not an intermediate and/or final result is affected by the occurred change in parameter are provided and valid intermediate results are stocked.

In this last given example for instance the renderer perform the rendering after having requested and received the parameters needed for the rendering (resolution parameters, color management parameters etc. etc.) performs the rendering operation and stores the rendered file(s) together with dependencies and the parameters used for the rendering. This means that the dependencies are identified and marked. It is those dependencies and the parameter values which the verifier verifies by comparing them to the factual parameters at the time of prosecution.

Figure 5:
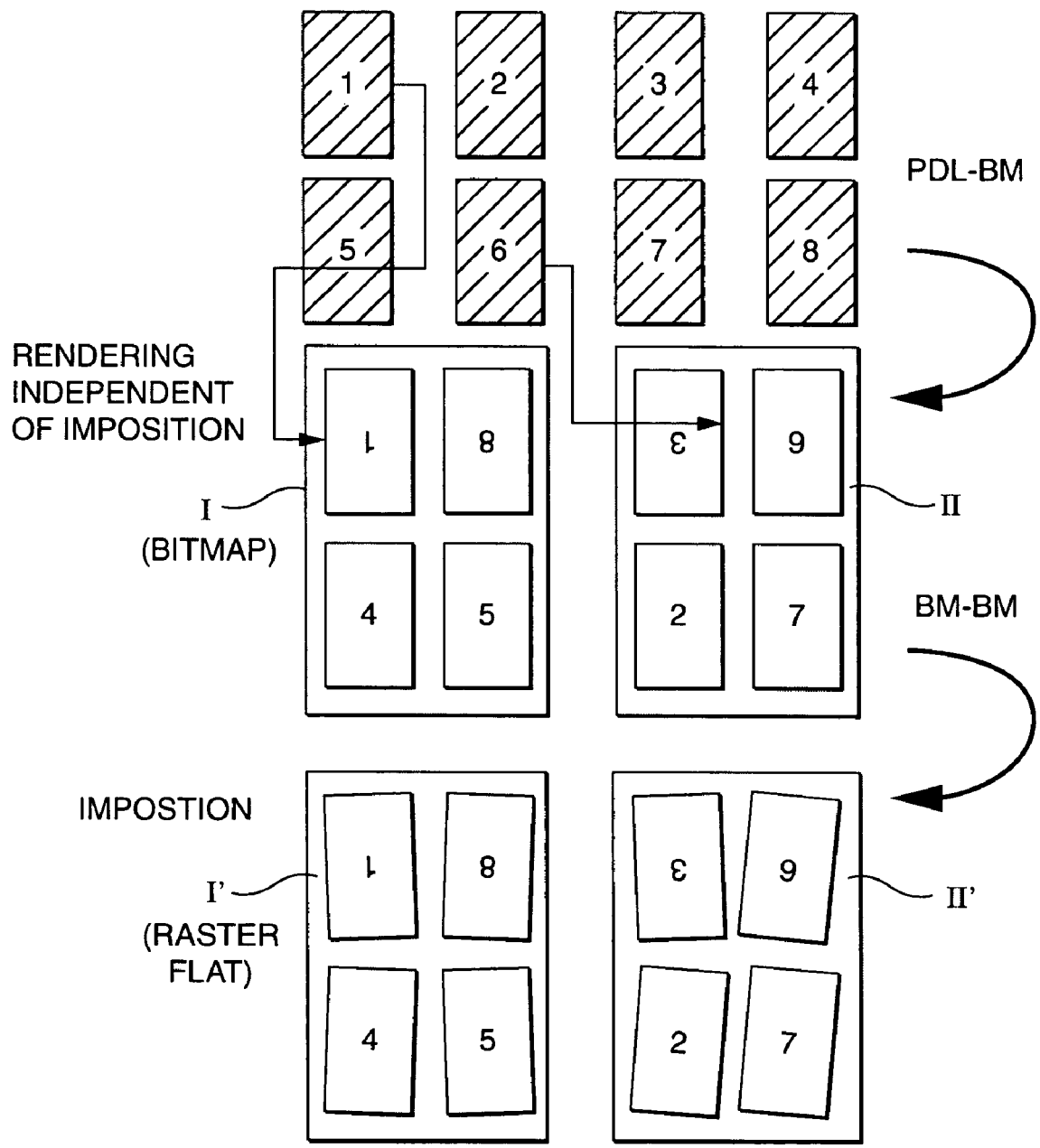
FIG. 5 illustrates schematically a method in which rendering independent of imposition is done prior to imposition.

FIG. 5 schematically illustrates a method in which a number of PDL files are rendered into bitmap files for each page, and a large bitmap file is made. Imposition of the pages is not done, be it that flipping of pages may be effected when the different bitmap files are assembled into one large sheet bitmap file. Thereafter imposition is effected. Imposition is thus performed after PDL-to bitmap rendering. This lowers the minimum system requirements for the PDL to bitmap rendering.

Figure 6:
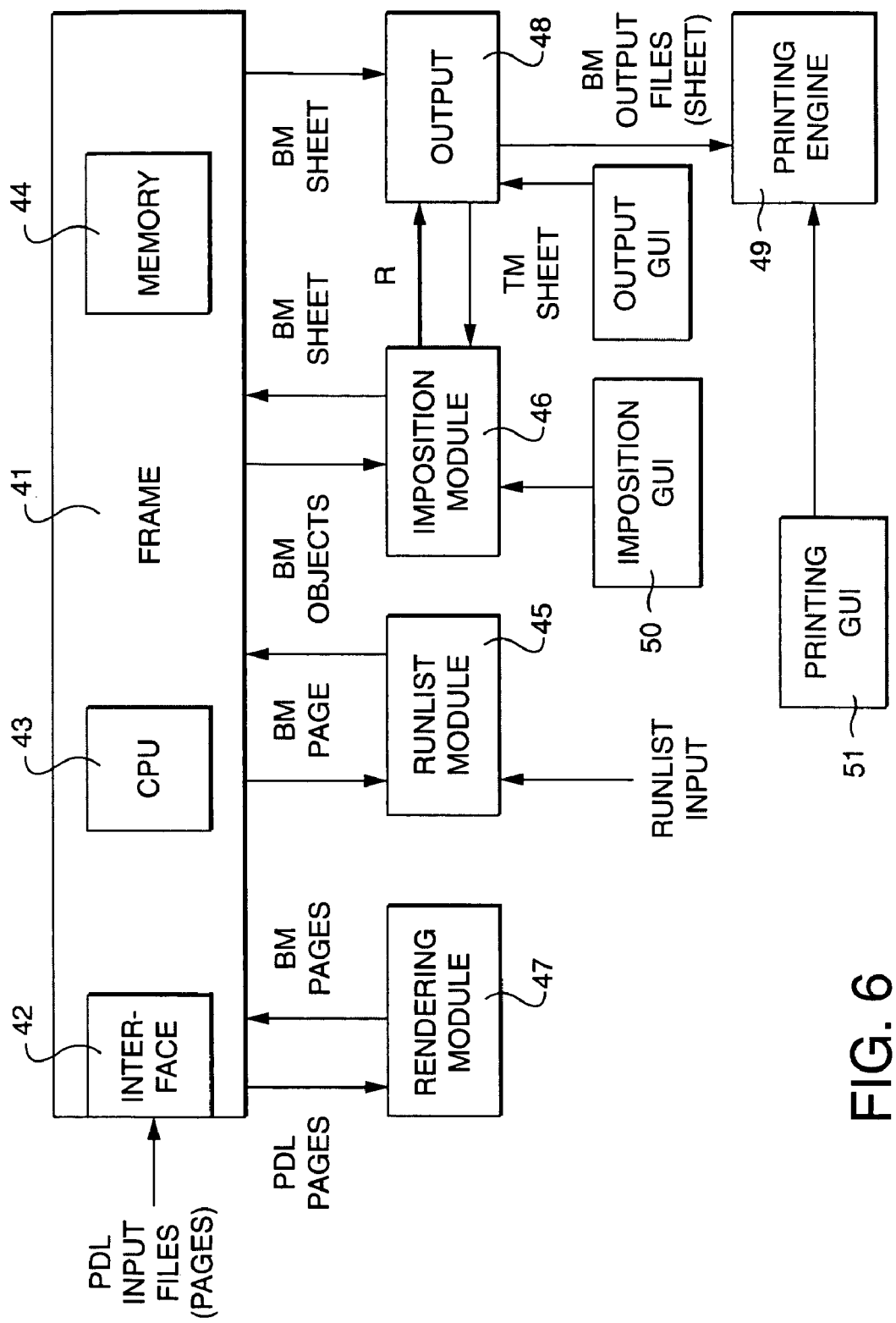
FIG. 6 illustrates schematically a system for a method in which rendering independent of imposition is done prior to imposition.

FIG. 6 illustrates a device for a method as illustrated in FIG. 5. The rendering module is now placed (seen in the flow of data) before the imposition module. Rendering is done page per page, independent on the imposition. The imposition module request (R) the transformation matrix TM from the output module. In this case the imposition is dependent on output parameters. In this case the rendered pages themselves are not dependent on imposition parameters per se (but may be on output parameters and/or printing parameters). Some output parameters may affect the imposition, the rendering or both.

Figure 7:
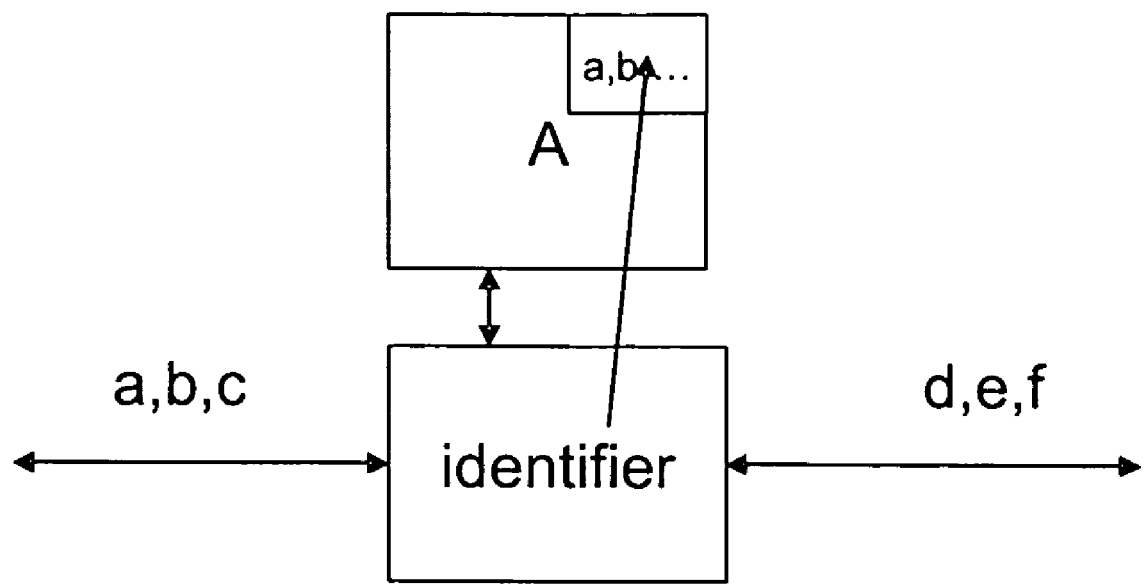
FIG. 7 illustrates the action of an identifier.

FIG. 7 illustrates the operation of an identifier. An identifier may be, within the framework any piece of hardware or software (usually software) having the function to identify and mark dependencies of one or more intermediate and/or final results to parameters in or for the workflow and/or to individual task processors in the production plan.

Schematically an intermediate or final result A is shown. The identifier has such an intermediate result either as an input, e.g. when the result itself is made by a different part of the system or a different part of the software, or as an output, e.g. when the identifier is, forms a part of or is coupled to a task processor which produces the intermediate or final result. The identifier is fed with, or finds itself the parameters a,b,c, d,e,f, on which the intermediate result is dependent. These may be parameters, within the workflow, defined before (a,b, c) the stage in which the intermediate result is produced as well as parameters (d,e,f) which are defined later in the workflow. The intermediate or final result A is tagged, i.e. is marked with the dependencies as well as the values of the parameters the result A is dependent upon.

FIG. 8 to 11 illustrate various schemes within the framework of the invention.

Figure 8:
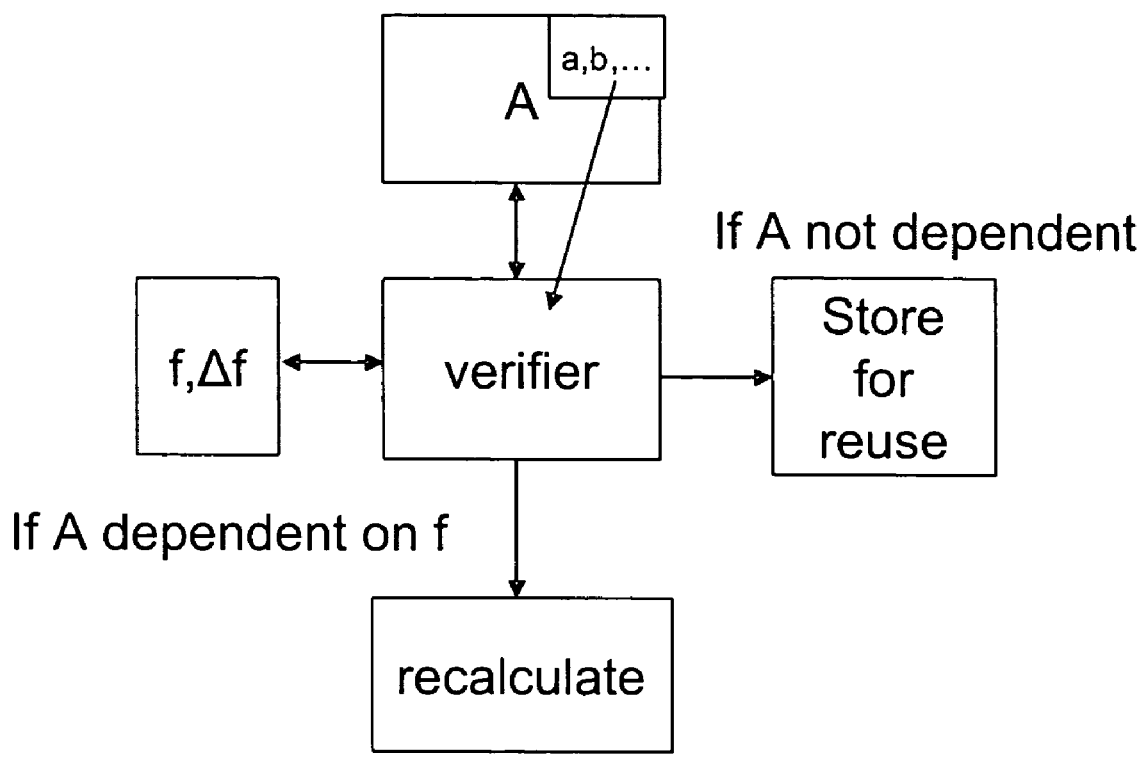
FIG. 8 illustrates a scheme for a decision policy according to an embodiment of the invention.

FIG. 8 shows a simple scheme. The verifier, which is any piece of hardware or software for performing a verification action, checks during rerun whether the parameter f has changed. Changing may mean a completely new value for f or s slight change $\Delta f$ from a previous value. In either case, the verifier checks whether or not the intermediate result is dependent on the parameter f and if so, what the value of is used for the intermediate result A. If A is not dependent on f, or if the value for f has not changed, the intermediate result is stored for reuse and no recalculation occurs. If A is dependent and f has changed the result A is recalculated. Compared to previous systems in which the whole process is rerun, an appreciable advantage is obtained.

Figure 9:
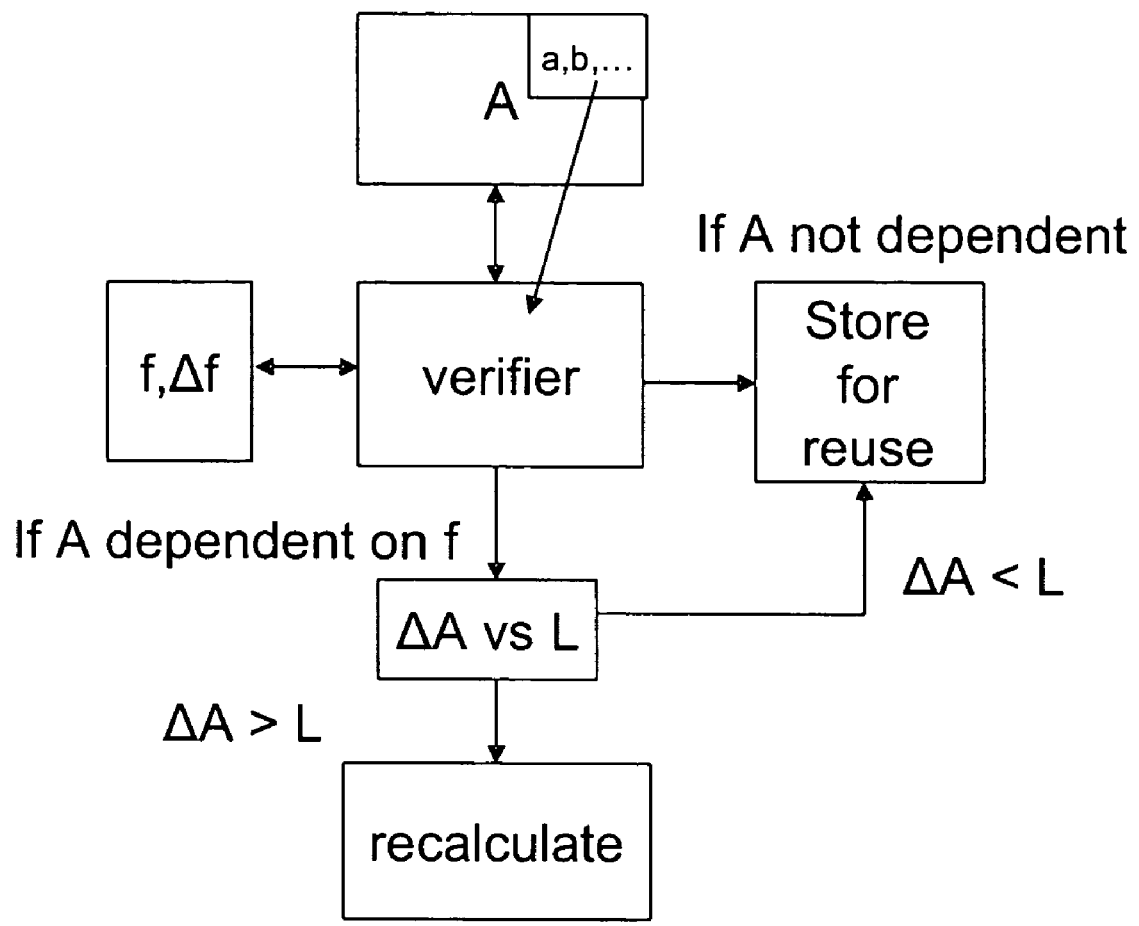
FIG. 9 illustrates a scheme for a preferred embodiment of the invention

FIG. 9 shows a decision scheme for a preferred embodiment of the invention. As in the scheme schematically shown in FIG. 8 the verifier checks whether or not the intermediate result is dependent on f and whether or not the value for f has changed. If A is not dependent on f, or if the value for f has not changed, the intermediate result is stored for reuse and no recalculation occurs. If A is dependent and f has changed a calculation or estimation of the effect of the change $\Delta f$ on the intermediate result (schematically indicated by $\Delta A$) is made.

It is remarked that such calculation of the effect does not comprise a recalculation of the intermediate result itself followed by comparing of the previous result with the recalculated result. Such actions would not give an advantage. However, although rather complex dependencies may exits between intermediate results, parameters and final results, there where variation of a parameter is (or variations of parameters are) rather small compared to (a) previous parameter(s) it is usually possible to obtain by relatively simple calculations or comparison (e.g. using a table) a reasonable "rule of thump" estimation of the effect of a change in parameter. Such an estimation of the effect $\Delta A$ is then compared to a limit value (here schematically indicated by value L).

If $\Delta A$ is smaller than L ($\Delta A<L$) the already existing result is stored for reuse, thus no recalculation is required. If $\Delta A$ is larger than L ($\Delta A>L$) the already existing result is not used, and the intermediate result is recalculated. The advantage of this embodiment is that there were only minor, relatively unimportant changes in parameters have occurred no recalculation with the associated loss of time occurs.

The value L may be a fixed value, but preferably the system comprises means to set the value L, either directly, i.e. the user sets a value for L, or indirectly, i.e. the value is coupled to and/or dependent of other settable parameters. Referring to the previous given example of color management a change in the color management parameters may change color rendition, even without completely recalculating new data, it is possible to estimate the effect of a change of color management on the color rendition, e.g. by calculating (or finding in a table) the effect of the change of color management on the average color point or the maximum deviation of color points.

Thus a change of color management parameters may be linked (either by calculation or by some table) to an estimated effect on color rendition. The estimated or calculated effect itself may then be compared to a "just tolerable" value L. If the estimated effect remains below the threshold, the "old values" are stored and no recalculation of date occurs, if the estimated effect is larger than the threshold L, recalculation occurs. The threshold or limit value L itself may be dependent on further parameters which may or may not be have been changed, such as the type of press, the inks used, the quality of the print, the required resolution, the paper used etc.

A change of color management resulting in a change of color rendition may be perfectly acceptable for newspaper print, but not for high quality prints. Therefore in preferred embodiments the verifier also comprises means for determining the dependencies of the limit value L on other parameter(s). This may be in the form of a formula, or in the form of a table, or in the form of a learn process. With the latter the following is meant. The system may originally comprise values for It is to be noted that there were mention is made of "a limit value L" or "threshold L", this may in fact be a set of more than one parameters.

Figure 10:
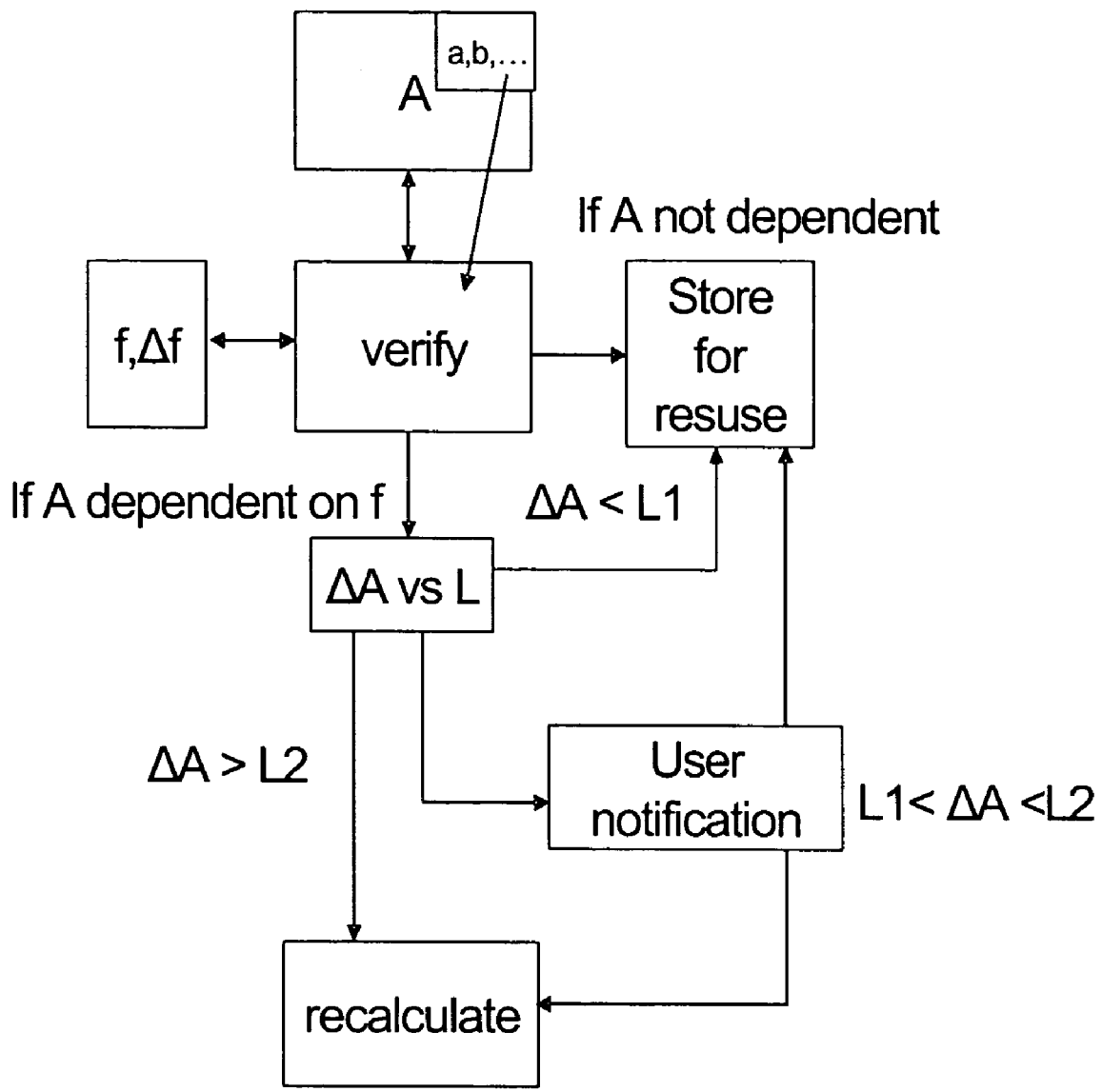
FIG. 10 illustrates a further scheme for a preferred embodiment of the invention.

FIG. 10 illustrates a variation on the scheme shown in FIG. 9. As in FIG. 9 an estimation of the effect ΔA of an occurred change Δf in parameter f is done and compared to a limit value L1. As in the scheme in FIG. 9, if ΔA<L1, the existing intermediate result is stored and reused. If ΔA>L2, where L2>L1, the intermediate result is recalculated. The difference with the scheme as shown in FIG. 9 is that when L1<ΔA<L2, i.e. in some intermediate regime, the system does not take a final decision, i.e. automatically performs a recalculation, but instead transmits a notification (e.g. a notification displayed on a display device) for a user that a change has occurred and transmits information on the change, e.g. by given the change in f or the change ΔA, whereupon the user has a choice, either to recalculate or not.

The advantage of the system enabling the scheme of FIG. 10 is that, the system and thus the printing process is not slowed down by the occurrence of changes in parameters that are either so small that there is no noticeable effect, nor so large that recalculation is mandatory anyway, yet does have a choice between speed and quality for an intermediate regime.

As in the scheme the system preferably comprises means to set the limit values L1 and L2. L1 could be or be set to zero, in which case the user would be notified of small changes also. The value for L2 could also be set to a very high value, in which case the user would be notified of any change in parameter. The values L1 and L2 themselves may be dependent on other parameter.

For instance when the printing quality forms a parameter set or to be set, a high quality "best" mode will decrease the values for L, L1 and L2 so that often recalculation of intermediate results will take place, whereas a "quick and dirty" mode will increase the values for L, L1 and L2, resulting often in reusing already calculated intermediate results.

As above, it is noted that there were mention is made of "a limit value L1, L2" or "threshold L1, L2", this may in fact be a set of more than one parameters. Also an occurred change may effect several qualities of the actual print (color rendition, position of the print, position of pages vis-á-vis each other, resolution etc) and therefore the verifier may have, in preferred embodiments, means to estimate or calculate several effects, relating to more than one aspect of the actual print, and compare the estimated or calculated effects to limit values.

The estimation of the effect may be implicit in the comparison for instance when a very simple parameter (such as size or length) is changed, the comparisons may then be simply "change less than x mm", "change between x and y mm", "change greater than y mm". In such a case the estimation of the effects can be done without calculation. ΔA is then simply equal to or a linear function of Δf.

Figure 11:
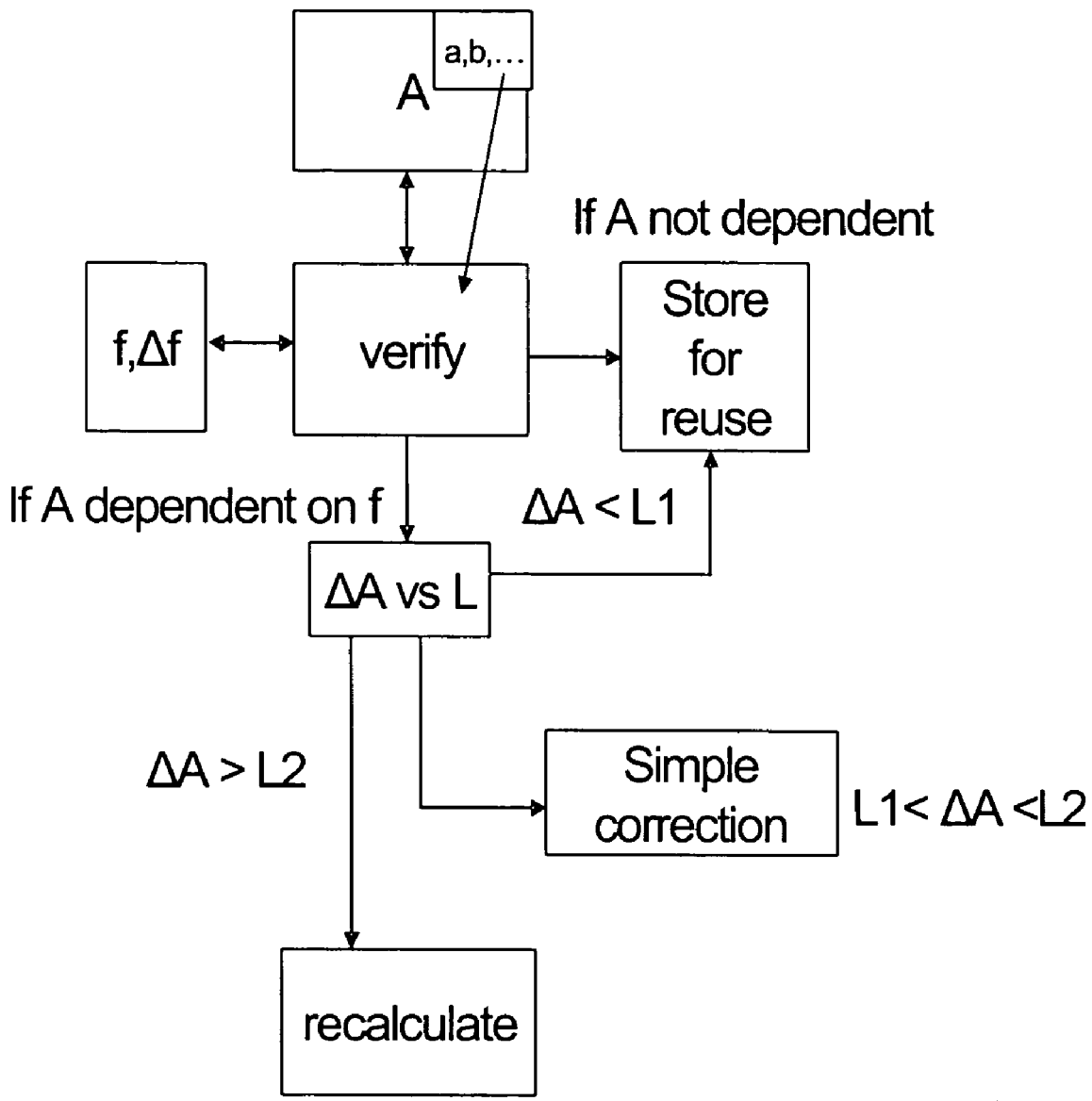
FIG. 11 illustrates a further scheme for a preferred embodiment of the invention.

FIG. 11 shows a variation of the scheme shown in FIG. 10. As in FIG. 10 the estimated effect ΔA of a change in parameter f is compared to limit values L1, and L2. When L1<ΔA<L2 no recalculation is performed but instead a correction on the previously calculated data is performed grosso modo without recalculation of the data. An example of an instance in which such is possible is the following: When a large flat is made comprising a slagline (a small line comprising some general data which is printed on the flat, changing the slagline will change the input of the renderer.

A complete rerendering of the flat would take a lot of time, in such a case it would be advantageous not to rerender but to delete the slagline from the flat and replace it with the new slagline. A correction thus amounts to not recalculating as was done for the original data but to grosso modo use the existing data but correct them. Usually the result will be of a lesser quality than completely recalculating the intermediate result but of a better quality than reusing the "old" intermediate result.

It is remarked that there were a job comprises several flats, the job system may have mean to establish for each flat whether or not recalculation of intermediate results is needed. To give an example: If color management is changed for printing a book comprising both text in black and white, black and white as well as color photography. Some of the flats may only comprise texts, other text and black and whit photo's while other flats comprises color photo's. The effect of a change in color-management may be tolerable for flats in black and white, but recalculation may be needed for flats comprising color photo's.

Note that in this example it is not necessarily so that the flats comprising the color photo's will per definition be the ones that are recalculated for instance in case a change in parameters has an effect on the resolution, and the required resolution for the black and white photos would be higher than for the color photos.

Figure 12:
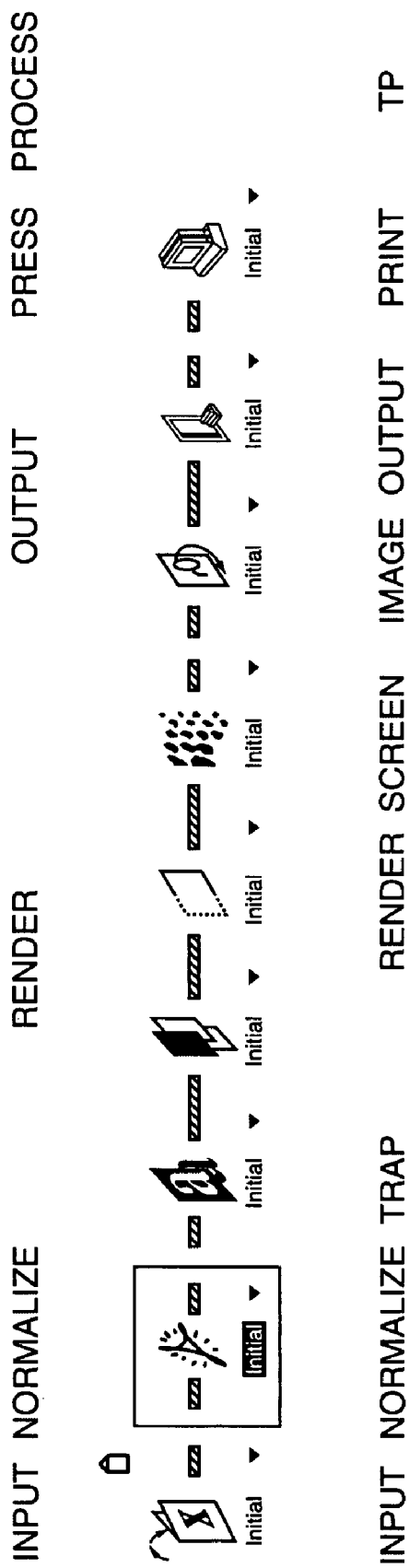
FIG. 12 shows schematically an example of a system and method in accordance with the invention for making color proofs.

FIG. 12 shows schematically an example of a system and method in accordance with the invention for making color proofs. The symbols symbolize several actions in a production plan, above the symbols for every process the corresponding operations are given, below the symbols the corresponding task processors (TP) are given.

The prepress processes are,

Input: imports the documents delivered into the Apogee X system

Normalize: converts Postscript to PDF and applies some post-processing on the PDF Render: converts PDF to bitmap Output: marks the rendered bitmap on the output device connected Press: defines some press related processing parameters The image operation includes a parameter called border. The input screen for this image operation is shown in FIG. 13. This border parameter defines the border to be created around the printed sheet. All objects (color bars, plate marks, etc . . . ) placed in the border are stored in the system as a PDF file.

These borders are defined per output device (CTP/CTF/Proofers) and are therefore part of the image operation of the output TP. The marks and color bars, which are defined in PDL, have to be converted to a bitmap by the Render TP. Within the production plan the render TP precedes the output TP. However rendering is dependent on the border parameter. So, the Render TP will put the border around the sheet before it starts the PDL to bitmap conversion and it will add a parameter dependency (=identification+marking) on the border selection parameter of the image operation. Therefore if the parameter border is changed the verifier will verify that indeed for rendering the border parameter is identified and marked and if there has been a change will notice the change.

In the simplest set-up of the system and method the render TP will rerender using the changed border parameters. As can be seen from FIG. 13 changes can be made in small increments (1 mm) or larger increments, to the left and the right.

An example of color management is given in FIG. 14. Here a screen is shown for input in the normalize task processor. The Normalize TP (task processor) includes a parameter called "convert all Pantone color names to" to select the Pantone color book to be used for looking up the color definitions of the spot colors used in the document. These pantone books are defined per paper type. Therefore the normalizer TP has an option to automatically use the paper type defined by the Press TP which is positioned (see FIG. 12) later within the production plan.

When selecting "follow paper type", the normalizer TP looks up and put a dependency on the Paper Type parameter of the print operation (=identification and marking). If the user selects the paper type, and does not put a fink in the "convert all Pantone books color names to Follow paper type", in the normalize TP this dependency is not set. If the paper type is changed and the normalized TP has marked the dependency, the normalisation operation is to be redone, or in more sophisticated embodiments an estimation of the effect of the change in paper type has to be made.

In short the invention can be described as follows:

A job control system for a document processing system wherein a number of tasks is performed in a workflow comprises a user interface to define or change parameters. The job control system comprises an identifier to identify and mark dependencies of one or more intermediate and/or final results to parameters. This enables a verifier, also part of the job control system, to verify, during execution of the job, a change in parameter and establish whether or not an intermediate and/or final result obtained before the change in parameter is still useable despite the occurred change in parameter. The job control system furthermore comprises a means for storing the usable intermediate and/or final results. This enables, in case a parameter is changed to use those results that are still useable, thus saving time.

The parameters may and often will be set, within the workflow scheme, in front of or behind the actual stage where the intermediate result is made.

It will be appreciated by persons skilled in the art that the present invention is not limited by what has been particularly shown and described hereinabove. The invention resides in each and every novel characteristic feature and each and every combination of characteristic features. Reference numerals in the claims do not limit their protective scope. Use of the verb "to comprise" and its conjugations does not exclude the presence of elements other than those stated in the claims. Use of the article "a" or "an" preceding an element does not exclude the presence of a plurality of such elements.

The present invention has been described in terms of specific embodiments, which are illustrative of the invention and not to be construed as limiting. The invention may be implemented in hardware, firmware or software, or in a combination of them. Other embodiments are within the scope of the following claims.

The invention also relates to methods as defined in the set of claims and to computer programs for use in a system or a method in accordance of the invention.

What is claimed is:

1. A job control system for controlling a job in a document processing system in which processing system a number of tasks is performed in a workflow, the job control system comprising:
    an input source with a user interface arranged to enable a user to define and change a set of job parameters;
    an identifier arranged to identify and mark dependencies of results of said job to said set of job parameters, wherein said results are selected from a group of intermediate results of said job and final results of said job, and wherein said set of job parameters are selected from a group of parameters for said workflow, parameters within said workflow, and parameters for individual task processors in a production plan defining processing of said job;
    a verifier arranged to verify, during job execution, a change in a particular parameter out of said set of job parameters, and to determine a condition if (a) a particular result out of said results and obtained before said change in said particular parameter is independent of said particular parameter, or (b) if an effect of said change in said particular parameter on said particular result is within a given limit; so that said particular result is still useable despite said change in said particular parameter;
    a memory arranged to store said particular result that is still useable; and
    a controller arranged to reuse said particular result only when said verifier has determined that the condition (a) or (b) has been met.

2. The job control system according to claim 1 wherein said results include a specific result provided by a specific task processor and wherein said identifier forms part of said specific task processor.

3. The job control system according to claim 1 wherein said verifier includes:
    a calculator for calculating said effect of said change in said particular parameter on said particular result;
    a comparator for comparing said effect to said given limit.

4. The job control system according to claim 1 wherein said verifier includes:
    an estimator for estimating said effect of said change in said particular parameter on said particular result;
    a comparator for comparing said effect to said given limit.

5. The job control system according to claim 1 further comprising a controller for changing a job ticket for processing a particular job by said document processing system after said change in said particular parameter, wherein said changing said job ticket is for using said stored still useable results, and for automatically resubmitting said particular job to said document processing system.

6. The job control system according to claim 3 further comprising a controller for changing a job ticket for processing a particular job by said document processing system after said change in said particular parameter, wherein said changing said job ticket is for using said stored still useable results, and for automatically resubmitting said particular job to said document processing system.

7. The job control system according to claim 4 further comprising a controller for changing a job ticket for processing a particular job by said document processing system after said change in said particular parameter, wherein said changing said job ticket is for using said stored still useable results, and for automatically resubmitting said particular job to said document processing system.

8. The job control system according to claim 1 further comprising a display device to display to a user said useable results.

9. The job control system according to claim 8 wherein said display device is arranged to display said dependencies to said job parameters of said useable results.

10. A method for controlling a job in a document processing system in which processing system a number of tasks is performed in a workflow, characterized in that the method comprises:
   identifying and marking dependencies of results of said job to job parameters, wherein said results are selected from a group of intermediate results of said job and final results of said job, and wherein said job parameters are selected from a group of parameters for said workflow, parameters within said workflow, and parameters for individual task processors in a production plan defining processing of said job;
   verifying, during job execution, a change in a particular parameter out of said job parameters, and determining a condition if (a) a particular result out of said results and obtained before said change in said particular parameter is independent of said particular parameter, or (b) if an effect of said change in said particular parameter on said particular result is within a given limit; so that said particular result is still useable despite said change in said particular parameter;
   storing the still useable results; and
   reusing said particular result only when the condition (a) or (b) has been met during the verifying step.

11. The method according to claim 10 further comprising:
   changing a job ticket for processing a particular job by said document processing system after said change in said particular parameter, wherein said changing said job ticket is for using said stored still useable results;
   automatically resubmitting said particular job to said document processing system.

12. A computer readable medium comprising program code to carry out the method according to claim 10 when run on a computer.

13. A computer readable medium comprising program code to carry out the method according to claim 11 when run on a computer.

* * * * *